United States Patent [19]

Pruden

[11] 4,249,459
[45] Feb. 10, 1981

[54] FLUID COUPLING FOR A ROTARY CHUCK

[75] Inventor: Samuel H. Pruden, East Hartford, Conn.

[73] Assignee: Cushman Industries, Incorporated, Hartford, Conn.

[21] Appl. No.: 963,958

[22] Filed: Nov. 27, 1978

[51] Int. Cl.³ .................. F15B 11/08; F15B 13/04; B23B 31/30
[52] U.S. Cl. .................................. 92/106; 91/420; 279/4; 308/36.3
[58] Field of Search .................. 92/106; 91/420; 285/136, 190; 279/4; 308/36.3

[56] References Cited

U.S. PATENT DOCUMENTS

| | | | |
|---|---|---|---|
| 2,283,022 | 5/1942 | Wallgren | 308/36.3 |
| 3,918,352 | 11/1975 | Reich et al. | 92/106 |
| 3,926,446 | 12/1975 | Rohm | 92/106 X |
| 3,954,275 | 5/1976 | Pickles | 91/420 X |

Primary Examiner—John M. Jillions
Attorney, Agent, or Firm—Walter Spruegel

[57] ABSTRACT

Journalled in a peripheral groove in an operationally turning chuck body is a non-turning fluid coupling ring of which opposite side faces confront opposite side walls of the groove. Leading from annular ports in the groove walls are fluid passages which extend to chuck-closing and chuck-opening ends of a cylinder in the chuck body, and provided in the ring are fluid supply passages which lead to the opposite ring faces where they are in line with the ports in the confronting groove walls. The coupling ring has some lateral play in the body groove and acts as a shuttle valve in being operationally backed with either face into sealing engagement with the confronting groove wall by the pressure of operating fluid admitted to the port in the groove wall confronting the opposite ring face. Such operational back-up of the coupling ring with either side against the confronting groove wall will also open a gap between the opposite ring side and the confronting groove wall, and such gap at either ring side is open to the atmosphere and has associated therewith a sealing ring which is mounted on the chuck body and extends into the path of fluid escaping through the gap, with the sealing ring being flexed into closure of the gap to the atmosphere by fluid escaping into the gap.

3 Claims, 10 Drawing Figures

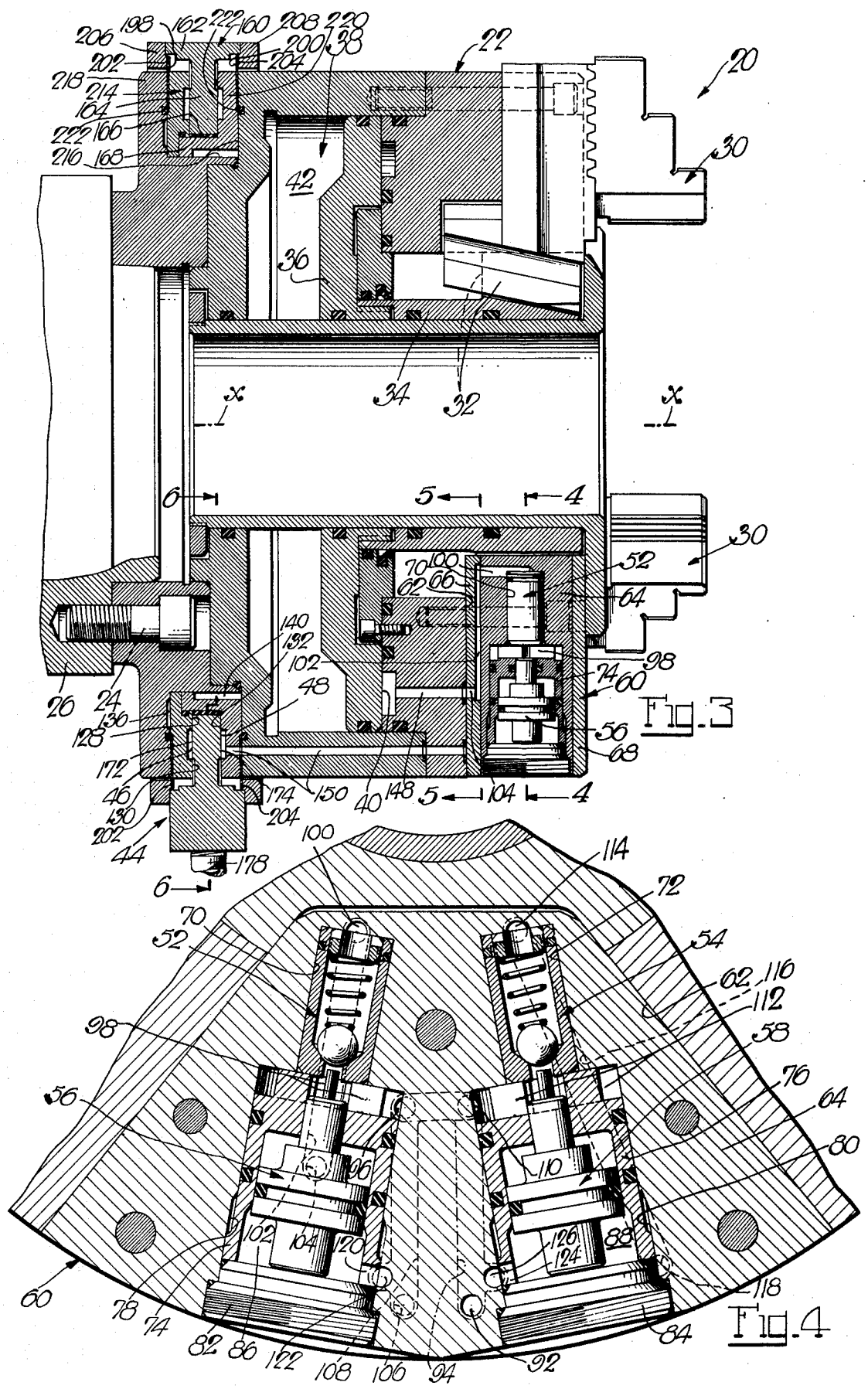

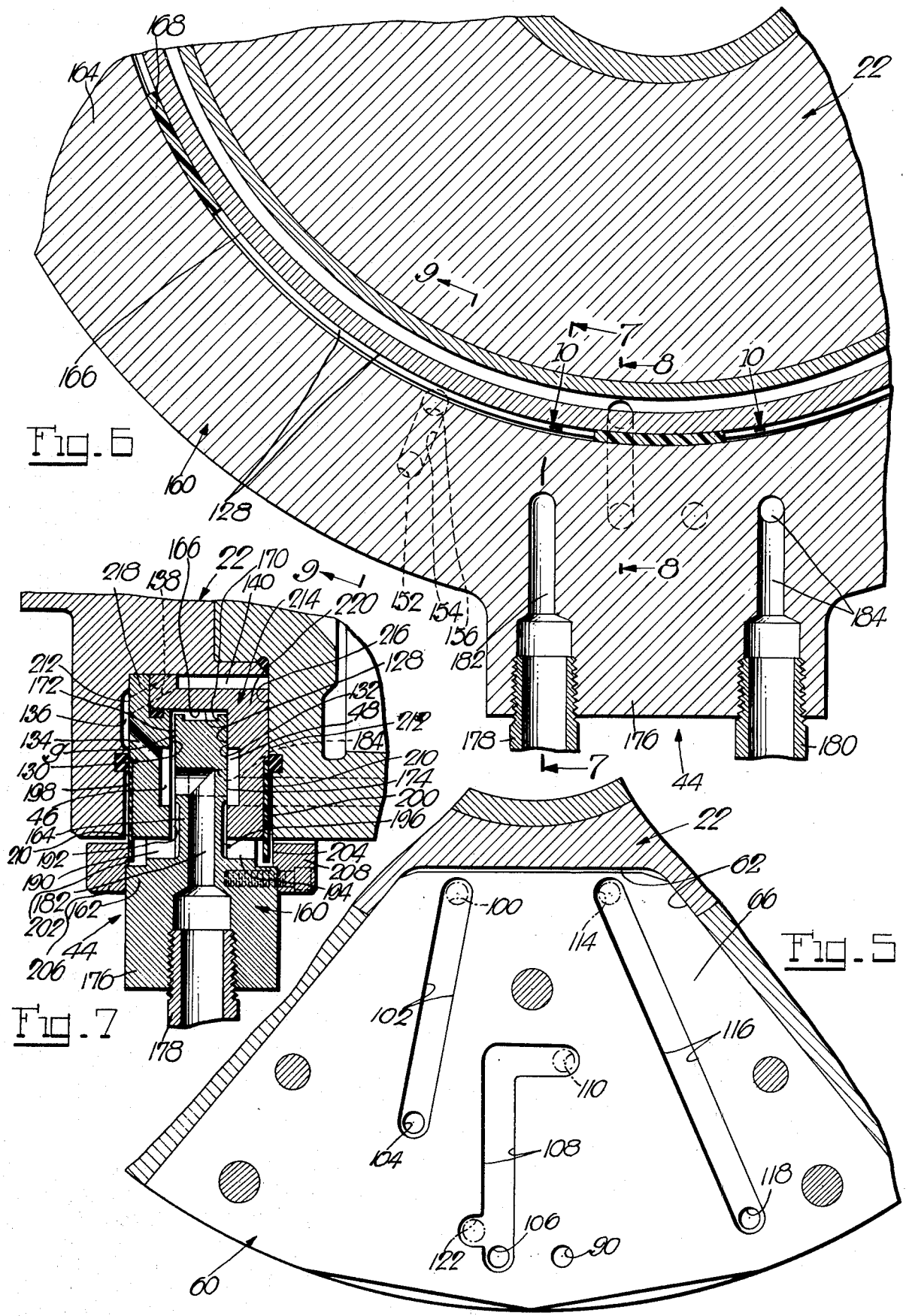

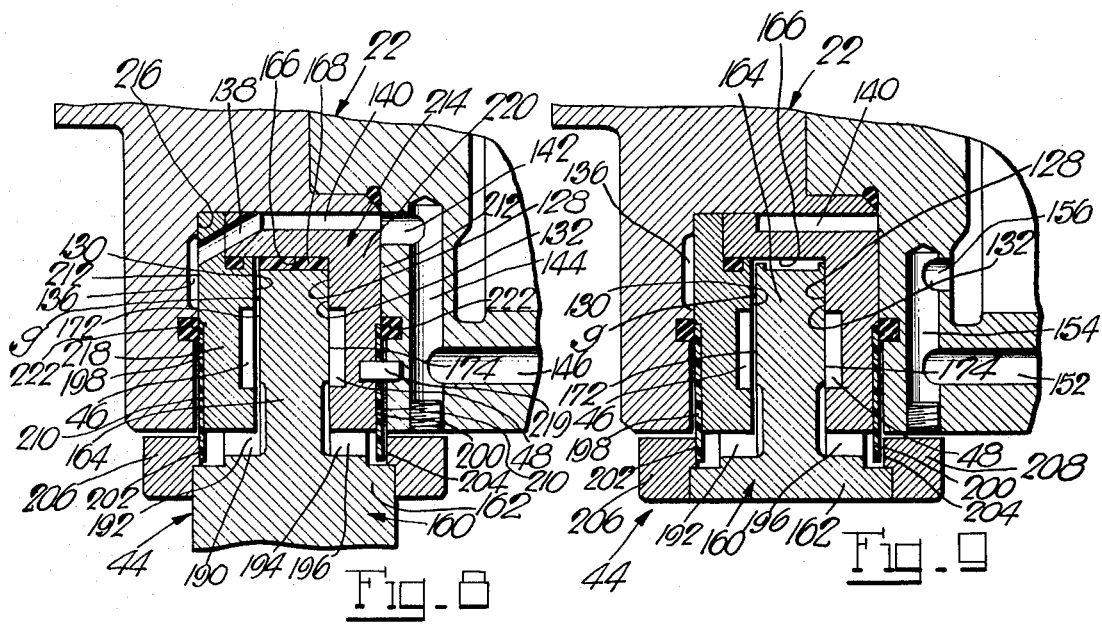
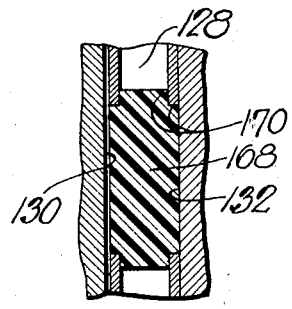

FLUID COUPLING FOR A ROTARY CHUCK

This invention relates to chucks of fluid-operated type in general, and to fluid couplings for chucks of this type in particular.

The invention is concerned with couplings for connecting a fluid supply source with an operating cylinder associated with a chuck and turning therewith, and is directed to a known type of coupling in the form of a ring which is advantageous in that it lends itself to direct mounting on a chuck for a compact and condensed chuck unit complete with a contained operating cylinder and a fluid coupling therefor which is adapted for direct connection with fluid supply conduits. Such a ring-type coupling is directly journalled on the body of a chuck, and is provided with passages that lead from fixed supply conduits to orifices in the chuck body which extend to the chuck-closing and chuck-opening ends of the operating cylinder, with the coupling being held against rotation with the chuck. To prevent leakage of fluid from any known coupling of this type when charging either end of the operating cylinder in the associated chuck while the same is at rest, the coupling carries resilient sealing rings which are located in the path of fluid admitted to the respective passages in the coupling, with the fluid thus admitted to either passage expanding the respective sealing ring into seating engagement with the chuck body to thereby seal off any fluid escape path at the cross-over between this passage in the coupling and the continuing orifice in the chuck body and provide communication between them.

While fluid couplings of ring type are entirely satisfactory in most respects, they afford less than full satisfaction in a few respects owing to the mount of the sealing rings in the couplings and their operational expansion into seating engagement with the associated chuck bodies. Thus, with the resilient sealing rings being carried by the non-turning coupling, disengagement of either of these rings from seating engagement with the associated chuck body is achieved with sole reliance on its self-recovery from operational expansion on interruption of fluid flow through the associated passage in the coupling. Hence, operational expansion of the sealing rings must be fairly extensive and also somewhat tortuous in order that their self-recovery will be adequate for assured disengagement from the chuck body, wherefore these sealing rings are subjected to considerable wear and tear and have a correspondingly short useful life. Also, in the case of a preferred ring-type coupling which is seated in a peripheral groove formation in an associated chuck body, the required fairly extensive and somewhat tortuous expansion of the sealing rings into reliable sealing engagement with the associated chuck body and their self-recovery for assured disengagement from the chuck body requires firm mounts of these rings in the coupling, which involves quite intricate machining of the coupling for the formation of these ring mounts. Further, and also in the case of the same preferred ring-type coupling, the weight of the coupling and its smooth support on the associated chuck body depend a good deal on the thickness of the coupling which is necessarily fairly substantial owing to the location of the sealing rings inside the opposite sides of the coupling and on opposite sides of the passages therein.

It is a primary object of the present invention to provide for a chuck a fluid coupling of ring type which, besides having all the advantages of the prior fluid couplings of this type, is also entirely satisfactory in the few respects in which these prior couplings afford less than full satisfaction.

It is another object of the present invention to provide for a chuck a fluid coupling of this type of which the characteristic ring body is, like that of the aforementioned prior preferred fluid coupling, seated in a peripheral groove in the chuck body, but the coupling is sealed against leakage of fluid from either side of the ring body to the other side thereof and also to the atmosphere in such manner that the ring body as well as the peripheral groove in the chuck body are devoid of any sealing rings. To achieve this in part, the ring body is arranged to act as a shuttle valve, being backed with either side against the adjacent side of the peripheral groove in the chuck body by the pressure of operating fluid forced from the passage at the other side of the ring body into the continuing orifice in the adjacent side of the groove in the chuck body, with either side of the ring body thus backed against the adjacent groove side being in firm and reliable sealing engagement with the latter to prevent leakage of fluid into the passage and orifice leading to and from these sealed ring and groove sides. Thus, in the absence of any sealing rings in the ring body and in the peripheral groove in the chuck body, the ring body and groove are formed accurately by machining which is quite simple and not at all intricate, and the ring body may be kept at a considerably smaller thickness than the aforementioned prior ring body with the contained sealing rings, which makes for particularly light weight of the ring body and also for smooth support of the same in the peripheral groove in the running chuck body. Further, the sealing action of the ring body is particularly reliable and effective by fitting the same sufficiently loosely in the peripheral groove in the chuck body to have some slight side shake therein, which also enhances the smooth support of the ring body in the peripheral groove in the running chuck body.

It is a further object of the present invention to provide for a chuck a fluid coupling of this type of which the ring body acts as a shuttle valve in the associated chuck body to achieve partial sealing of the coupling against leakage of operating fluid therefrom as aforementioned, and the remaining sealing of the coupling against leakage of operating fluid therefrom, this being fluid leakage from either side of the ring body to the atmosphere, is achieved by seals of ring disc form which are carried by the chuck body and extend radially outwardly from the periphery of the latter and there confront annular shoulders on the ring body which are outwardly spaced from the periphery of the chuck body by annular gaps that define the exit ends of the sole escape paths of operating fluid from the respective sides of the ring body to the atmosphere, with either disc seal being forced into seating engagement with the confronting shoulder on the ring body by operating fluid in the respective escape path to thus seal off the latter from the atmosphere while fluid is admitted to the operating cylinder in the chuck body via the respective side in the ring body. With the disc seals thus carried by the chuck body and projecting radially outwardly therefrom, they are assuredly held out of dragging contact with the ring body by centrifugal force on the power drive of the chuck, and they are operationally forced into sealing engagement with the respective shoulders on the ring body by simple flexure, wherefore these disc seals are subjected to little wear and tear and have a long useful life.

Further objects and advantages will appear to those skilled in the art from the following, considered in conjunction with the accompanying drawings.

In the accompanying drawings, in which a certain mode for carrying out the present invention is shown for illustrative purposes:

FIG. 3 is a section through the chuck and mounted fluid coupling as taken substantially on the line 3—3 of FIG. 1;

FIGS. 4 and 5 are enlarged fragmentary sections through the chuck with the mounted fluid coupling as taken substantially on the lines 4—4 and 5—5, respectively, in FIG. 3;

FIG. 6 is an enlarged fragmentary section through the mounted fluid coupling as taken on the line 6—6 in FIG. 3; and FIGS. 7 to 10 are fragmentary sections through the mounted fluid coupling as taken substantially on the lines 7—7, 8—8, 9—9 and 10—10, respectively, in FIG. 6.

Figure 1:
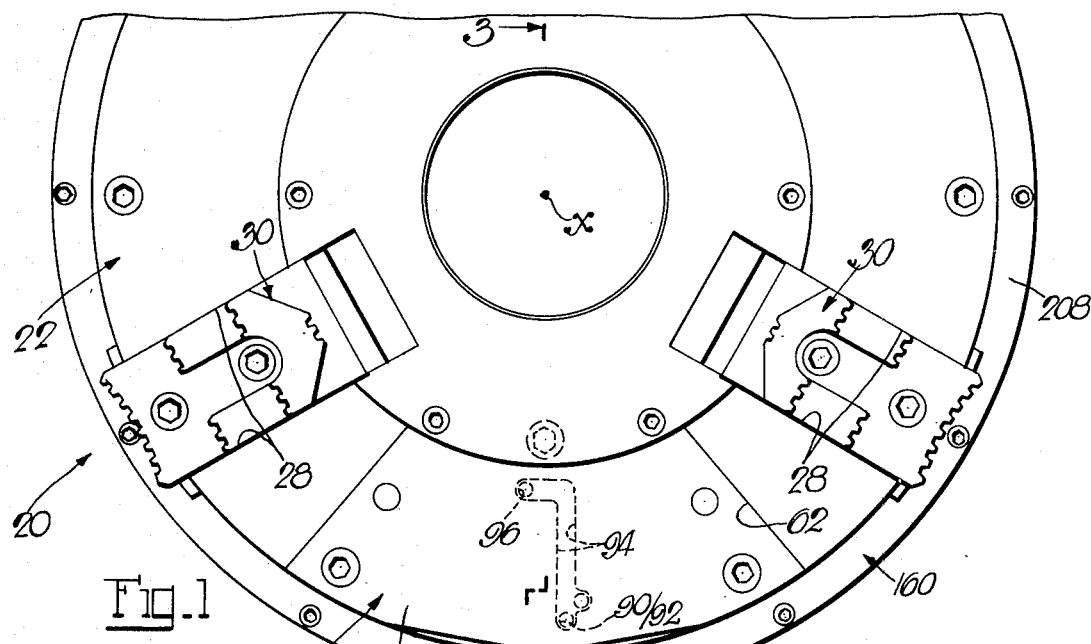
FIGS. 1 and 2 are front and side views of a chuck with a mounted fluid coupling that embodies the invention.
Figure 2:
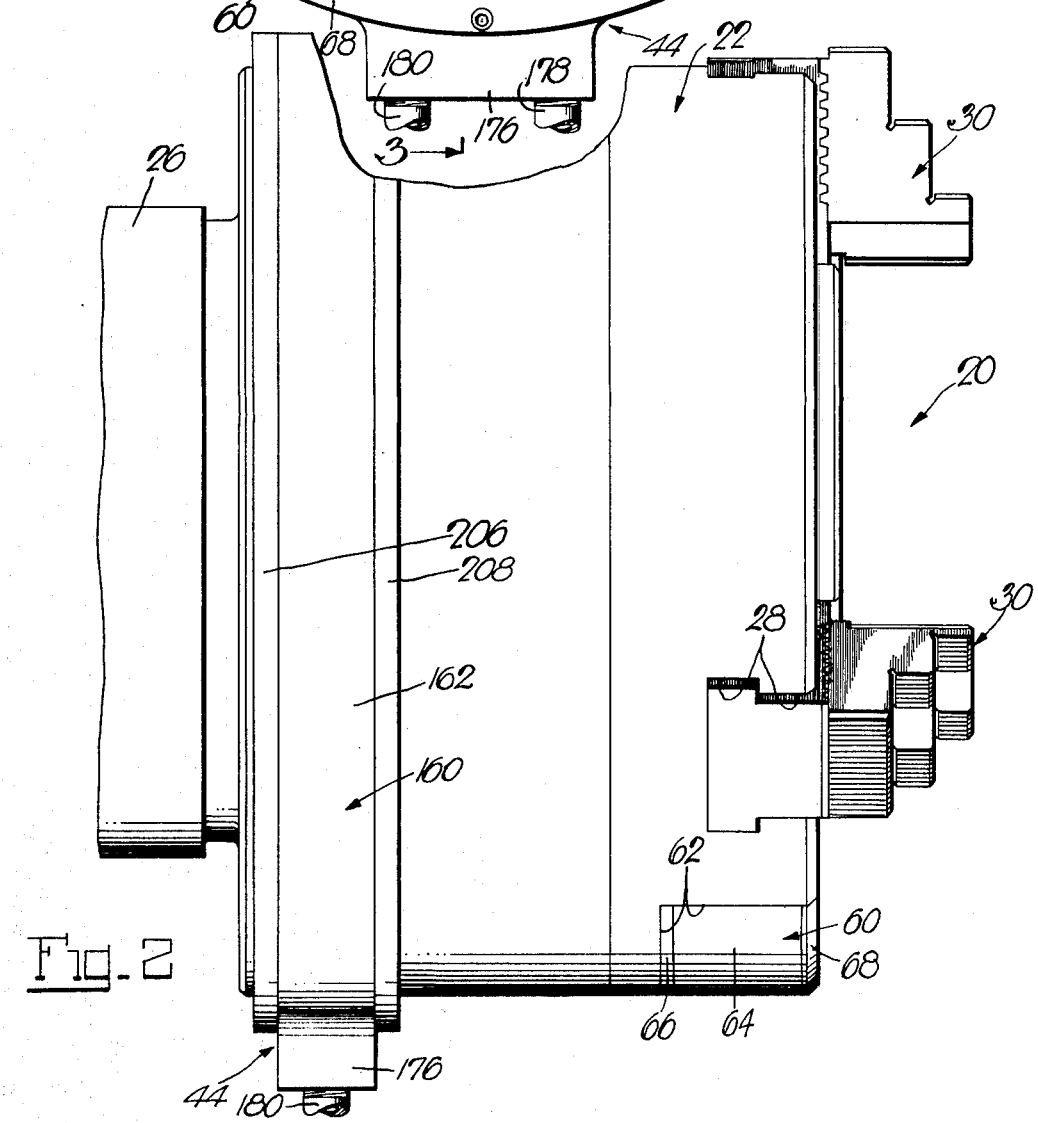

Referring to the drawings, and more particularly to FIGS. 1 to 3 thereof, the reference numeral 20 designates a chuck having a body 22 which at 24 is mounted on the power spindle 26 of an exemplary lathe for rotation about an axis x. The chuck body is at the front provided with radial ways 28 for jaws 30 which in this instance are opened and closed by wedge connections 32 with an operating sleeve 34 on a piston 36 in a cylinder 38 in the chuck body. Thus, on admitting operating fluid under pressure, in this instance compressed air, to the end 40 of the cylinder 38 and simultaneously venting the other end 42 thereof, the jaws 30 are moved inwardly to close on work. Conversely, on admitting operating fluid to the cylinder end 42 and simultaneously venting the other cylinder end 40, the jaws 30 are opened.

The chuck is provided with a fluid coupling 44 which delivers operating fluid from suitable supply lines to ports 46 and 48 in the chuck body and continuing passages that lead to the opposite cylinder ends 40 and 42. For safe chuck operation, there is interposed in each of these passages a check valve which opens to admit operating fluid to the respective cylinder end, but closes to block the escape of fluid from the latter when the pressure of the fluid in the passage ahead of this check valve drops below that of the fluid in the associated cylinder end, as in the event of a break or leak in the supply line for this cylinder end. However, either of these check valves is opened by an associated plunger for venting of the respective cylinder end when operating fluid is admitted to the other cylinder end. The check valves in the fluid passages to the chuck-closing and chuck-opening cylinder ends 40 and 42 are designated by the reference numerals 52 and 54, respectively, and the plungers associated with the check valves 52 and 54 are designated by the reference numerals 56 and 58, respectively (FIGS. 3 and 4). The check valves 52 and 54 and their associated plungers 56 and 58 are arranged in this instance as part of a control unit 60 which is removably mounted in a recess 62 in the front of the chuck body 22, with this unit 60 also providing a block 64 and opposite end plates 66 and 68 (FIGS. 1 to 5). Thus, the check valves 52 and 54 are received in bores 70 and 72 in the block 64, and the plungers 56 and 58 are received in sleeves 74 and 76 in enlarged bores 78 and 80 in this block, with the open ends of the sleeves 74 and 76 being closed by plugs 82 and 84 to form chambers 86 and 88. The check valve 52 is interposed in a fluid path through the unit 60, with this fluid path being formed by aligned bores 90 and 92 in the rear plate 66 and block 64 (FIGS. 1 4 and 5), an L-shaped groove 94 in the front plate 68 to which the bore 92 leads, a continuing bore 96 in the block 64 which leads to a space 98 at one end of the check valve 52 (FIGS. 3 and 4), a bore 100 which leads from the opposite end of the check valve 52, and a groove 102 and continuing bore 104 in the rear plate 66 (FIG. 3). The other check valve 54 is interposed in another fluid path through the unit 60, with this other fluid path being formed by a bore 106 and continuing L-shaped groove 108 in the rear plate 66 (FIGS. 4 and 5), a bore 110 in the block 64 which leads to a space 112 at one end of the check valve 54 (FIG. 4), a bore 114 which leads from the opposite end of the check valve 54, and a groove 116 and continuing bore 118 in the rear plate 66 (FIG. 5). As already mentioned, the plunger 56, which is associated with the check valve 52 for the chuck-closing cylinder end 40, is subjected to operating fluid for venting this cylinder end 40 on admission of operating fluid to the chuck-opening cylinder end 42. To that end, the chamber 86 in the sleeve 74 communicates, through an aperture 120 in the latter and a connecting bore 122 in the block 64, with the groove 108 in the rear plate 66 which is part of the described fluid path with the interposed check valve 54 for the chuck-opening cylinder end 42. Accordingly, on admitting operating fluid to the chuck-opening cylinder end 42 via the check valve 54, operating fluid is also admitted to the chamber 86 for activating the plunger 56 to open the other check valve 52 and vent the chuck-closing cylinder end 40. Conversely, the other plunger 58, which is associated with the other check valve 54 for the chuck-opening cylinder end 42, is subjected to fluid for venting this cylinder end 42 on admission of operating fluid to the chuck-closing cylinder end 40. To that end, the chamber 88 in the sleeve 76 communicates, through an aperture 124 in the latter and a bore 126 in the block 64, with the groove 94 in the front plate 68 which is part of the described fluid path for the chuck-closing cylinder end 40. Accordingly, on admitting operating fluid to the chuck-closing cylinder end 40 via the check valve 52, operating fluid is also admitted to the chamber 88 for activating the plunger 58 to open the other check valve 54 and vent the chuck-opening cylinder end 42.

The aforementioned coupling 44 passes operating fluid to and from the chuck-closing and chuck-opening cylinder ends 40 and 42 via the ports 46 and 48 and continuing fluid passages in the chuck body which lead to these cylinder ends, with these passages including the described fluid paths through the control unit 60. The fluid coupling 44 is received in a peripheral groove 128 in the chuck body 22, and the ports 46 and 48 are in the form of annular grooves in the opposite side walls 130 and 132 of this groove 128 (FIGS. 3 and 7 to 9). The fluid passage to the chuck-closing cylinder end 40 is formed in the chuck body 22 by one or more bores 134 which lead from the port 46, an annular channel 136 to which the bores 134 lead (FIG. 7), one or more bores 138 which lead from the channel 136, another annular channel 140 to which the bores 138 lead (FIG. 8), three successive bores 142, 144 and 146, of which bore 142 leads from the channel 140 and bore 146 leads to, and is continuous with, the bore 90 of the described fluid path through the unit 60 which constitutes the continuation of the fluid passage through this unit, with this fluid passage being beyond the unit 60 continued in the form of a bore 148 which leads to the chuck-closing cylinder inder end 40 (FIG. 3). The other fluid passage to the chuck-opening cylinder end 42 is formed in the chuck body 22 by a bore 150 (FIG. 3) which leads from the other port 48 to, and is continuous with, the bore 106 (FIG. 5) of the described fluid path through the unit 60 which constitutes the continuation of the fluid passage through this unit, with this fluid passage being continued beyond the unit 60 in the form of successive bores 152, 154 and 156 that lead to the chuck-opening cylinder end 42 (FIG. 9). Thus, the chuck is closed on admitting operating fluid to the chuck-closing cylinder end 40 via the port 46, which also causes simultaneous venting of the chuck-opening cylinder end 42 via the port 48, as will be readily understood. Conversely, the chuck is opened on admitting operating fluid to the chuck-opening cylinder end 42 via the port 48, which also causes simultaneous venting of the chuck-closing cylinder end 40 via the port 46.

The fluid coupling 44, which constitutes the primary feature of the invention, provides an annular member 160 of T-section having an outer rim 162 and an inner ring 164, of which the ring 164 is received in the periphreal groove 128 in the chuck body 22 and is turnably supported on the cylindrical bottom 166 of this groove 128, in this instance through intermediation of spaced bearing pads 168 in recesses 170 in the inner surface of the ring 164. The coupling ring 164, which with its opposite side faces 172 and 174 confronts the respective side walls 130 and 132 of the body groove 128, has some lateral play in this groove 128 so as to leave a slight gap g between either side of the ring 164 and the confronting side wall of the groove 128 when the ring 164 is with its other side backed against the other side wall of the groove 128. Removably secured to a boss 176 on the coupling rim 162 are fluid supply conduits 178 and 180, of which conduit 178 connects with a duct 182 that is open to the port 46 in the chuck body 22 (FIGS. 6 and 7), while conduit 180 connects with a duct 184 that is open to the other port 48 in the chuck body. The coupling member 160 is in any suitable manner held against rotation with the chuck. The opposite side faces 172 and 174 of the coupling ring 164 and the adjacent side walls 130 and 132 of the body groove 128 are machined so that either side face 172 or 174 of the coupling ring will have a sealing fit with the confronting groove wall 130 or 132 when backed thereagainst. Thus, on admitting operating fluid through the conduit 178 and duct 182 in the coupling member 160 to the port 46 in the chuck body and on to the chuck-closing cylinder end 40, the pressure of the fluid at this port 46 will back the coupling ring 164 with its side face 174 against the groove wall 132 to thereby seal the other port 48 in the chuck body from all fluid leakage paths from the port 46 (FIG. 7). Conversely, on admitting operating fluid through the other conduit 180 and duct 184 in the coupling member 160 to the port 48 in the chuck body and on to the chuck-opening cylinder end 42, the pressure of the fluid at this port 48 will back the coupling ring 164 with its side face 172 against the groove wall 130 to thereby seal the other port 46 in the chuck body from all fluid leakage paths from the port 48. The coupling ring 164 thus serves advantageously as a simple and highly reliable shuttle valve to seal either port 46 or 48 in the chuck body 22 from all fluid leakage paths from the other port on admitting operating fluid to the latter.

Operating fluid admitted from the coupling ring 164 to either port 46 or 48 in the chuck body 22, by causing back-up of the ring with one side into sealing abutment with the groove wall in which the opposite port is formed, will open a gap g between the opposite side of the ring and the confronting groove wall thereat. Thus, on admitting operating fluid from the coupling ring 164 to the port 46, the ring 164 will be backed against the groove wall 132 and a gap g will be opened between the ring 164 and the other groove wall 130 (FIG. 7), with this gap g and a continuing annular space 190 between the coupling rim 162 and the body periphery forming a leakage path 192 for fluid from the port 46 to the atmosphere. Conversely, on admitting operating fluid from the coupling ring 164 to the port 48, the ring 164 will be backed against the groove wall 130 and a gap will be opened between the ring 164 and the other groove wall 132, with this gap and a continuing annular space 194 between the coupling rim 162 and the body periphery forming a leakage path 196 for fluid from the port 48 to the atmosphere. To avoid such fluid leakage to the atmosphere, there are provided two sealing rings or discs 198 and 200 which are associated with the respective leakage paths 192 and 196 (FIGS. 3 and 7 to 9), with these sealing discs 198 and 200 being mounted in the chuck body 22 and projecting outwardly therefrom into confronting relation with annular shoulders 202 and 204, respectively, that are formed by rings 206 and 208 on the coupling rim 162. Thus, on admitting operating fluid from the coupling member 160 to the port 46 in the chuck body for closing the chuck when the same is at rest, the coupling member is shuttled into sealing engagement with the side wall 132 of the body groove 128, and fluid escaping into the leakage path 192 will flex the sealing disc 198 into engagement with the shoulder 202 on the coupling rim 162, whereby all fluid leakage paths from the port 46 to the atmosphere and to the other port 48 are closed and the pressure of the fluid admitted to the chuck-closing cylinder end 40 is kept substantially at the fluid supply pressure. Conversely, on admitting operating fluid from the coupling member 160 to the port 48 for opening the chuck when the same is at rest, the coupling member is shuttled into sealing engagement with the side wall 130 of the body groove 128 and fluid escaping into the leakage path 196 will flex the sealing disc 200 into engagement with the shoulder 204 on the coupling rim 162, whereby all fluid leakage paths from the port 48 to the atmosphere and to the other port 46 are closed and the pressure of the fluid admitted to the chuck-opening cylinder end 42 is kept substantially at the fluid supply pressure.

In operation of the chuck, i.e., on its power drive, the non-turning coupling member 160 will seek a position in which at least one, and most likely both, of its opposite faces 172, 174 will be out of contact with the respective confronting groove walls 130 and 132, and at least one, but most likely both, of its shoulders 202, 204 will remain out of contact with the respective sealing discs 198 and 200, so that in no event will there be any noticeable drag between the coupling ring 164 and the body groove 128 and between the shoulders 202, 204 on the coupling member 160 and the sealing discs 198 and 200. Also on the power drive of the chuck the sealing discs are subjected to centrifugal force which resists any tendency of these discs to distort into rubbing contact with the shoulders 202 and 204.

For ready machining of the chuck for the formation of mounts for the sealing discs 198 and 200 and for ready assembly of the latter with the chuck, the mounts are formed as annular recesses 210 in the opposite side faces 212 of a ring insert 214 in a peripheral groove 216 in the chuck body, with this ring insert 214 being formed in two sections 218 and 220 to permit the placement of the coupling member 160 in the peripheral body groove 128 which is really provided in the ring insert 214. In order that the ring insert 214 will turn with the chuck body 22 on the power drive of the latter, the insert section 220 is drivingly connected with the chuck body 22 by a dowel pin 219 (FIG. 8), and the other insert section 218 may similarly be connected with the chuck body. Narrow inner peripheral margins of the sealing discs 198 and 200 are in abutment with sealing rings 222, and they are over their remaining wider peripheral margins free to flex outwardly into sealing engagement with the shoulders 202 and 204 on the coupling member 160 on being subjected to operating fluid in the leakage paths 192 and 194.

What is claimed is:

1. A fluid coupling for a rotary body having in its periphery an annular groove with opposite side walls and passages leading from said walls to the opposite ends, respectively, of a cylinder turning with said body, comprising an annular member having an outer rim part with opposite ends, and an inner ring part intermediate said ends and turnably supported in said body groove, of which said ring part has opposite side faces confronting said groove walls and fluid supply passages leading to said faces, respectively, where they are in register with said passages in the confronting groove walls, said rim part is outwardly spaced from said body periphery to form annular spaces on opposite sides of said ring part, and said ring part has axial play in said groove so as to open a gap between either ring face and confronting groove wall when said ring part is backed against the other groove wall by fluid pressure in said gap, with the gap on either side of the ring part leading to the annular space on the same side of the ring part, and said ring faces and groove walls being machined for a sealing fit of either ring face with the confronting groove wall when backed thereagainst, said rim part has at its ends inward shoulders facing said ring part and being spaced from said body periphery, and resilient rings mounted on said body and projecting outwardly from the periphery thereof into confronting and normally spaced relation with the respective shoulders, with either ring being by the pressure of fluid in the respective annular space flexed into seating engagement with the confronting shoulder to thereby seal said space from the atmosphere.

2. A fluid coupling as in claim 1, in which said sealing rings are urged by centrifugal force into disposition in radial planes in which they are out of engagement with the respective shoulders.

3. A fluid coupling as in claim 1, in which said groove has an annular bottom, and said ring part has an annular inner surface with angularly spaced recesses therein, and there are further provided bearing pads seated in said recesses and having a sliding fit with said groove bottom.

* * * * *